(12) United States Patent
Dils et al.

(10) Patent No.: US 7,217,069 B2
(45) Date of Patent: May 15, 2007

(54) HAND-HELD TOOL WITH A REMOVABLE OBJECT SENSOR

(75) Inventors: Jeffrey M. Dils, Simpsonville, SC (US); Kenneth M. Brazell, Piedmont, SC (US)

(73) Assignee: Eastway Fair Company Limited, Tortola (VG)

(*) Notice: Subject to any disclaimer, the term of this patent is extended or adjusted under 35 U.S.C. 154(b) by 561 days.

(21) Appl. No.: 10/832,493

(22) Filed: Apr. 27, 2004

(65) Prior Publication Data

US 2005/0069391 A1 Mar. 31, 2005

Related U.S. Application Data

(63) Continuation-in-part of application No. 09/993,177, filed on Nov. 16, 2001, now abandoned, which is a continuation-in-part of application No. 09/501,194, filed on Feb. 10, 2000, now Pat. No. 6,364,580.

(51) Int. Cl.
*B23B 45/00* (2006.01)

(52) U.S. Cl. ............. 408/124; 81/177.4; 310/47; 310/50; 362/119; 408/16; 408/241 R; 324/67

(58) Field of Classification Search ........... 408/16, 408/124, 241 R, 702; 362/118, 119; 310/47, 310/50; 324/67, 671, 637; 81/177.4; 33/334, 33/347, 379; 173/2, 217, 218
See application file for complete search history.

(56) References Cited

U.S. PATENT DOCUMENTS

| | | | |
|---|---|---|---|
| 4,508,221 A | 4/1985 | Olson | |
| 4,564,322 A | 1/1986 | Stapley | |
| 4,797,040 A | 1/1989 | Hibbard | |
| 4,932,294 A | 6/1990 | Chang | |
| 4,954,026 A | 9/1990 | Zurwelle | |
| 4,973,205 A | 11/1990 | Spaulding | |
| 5,148,108 A | 9/1992 | Dufour | |
| D331,356 S | 12/1992 | Amsberry | |
| 5,169,225 A * | 12/1992 | Palm | 362/118 |
| 5,170,545 A | 12/1992 | Hubscher | |
| 5,333,767 A | 8/1994 | Anderson | |
| 5,361,504 A | 11/1994 | Huang | |
| 5,405,004 A | 4/1995 | Vest et al. | |
| 5,445,479 A | 8/1995 | Hillinger | |

(Continued)

FOREIGN PATENT DOCUMENTS

DE 32 32 740 A 3/1984

(Continued)

OTHER PUBLICATIONS

International Search Report, mailed Apr. 24, 2000.

(Continued)

*Primary Examiner*—Daniel W. Howell
(74) *Attorney, Agent, or Firm*—Brinks Hofer Gilson & Lione; G. Peter Nichols (57) ABSTRACT

A hand-held power tool is provided with a housing, an attachment member, and an object sensor that is removable from the attachment member. The attachment member may be removable from the tool. The object sensor, which can be used to detect studs hidden behind walls, electrical lines, and other materials, is readily accessible to tradesmen.

15 Claims, 13 Drawing Sheets

U.S. PATENT DOCUMENTS

| | | |
|---|---|---|
| 5,484,026 A | 1/1996 | Susaki et al. |
| 5,562,240 A | 10/1996 | Campbell |
| D386,662 S | 11/1997 | Tozawa et al. |
| 5,797,670 A | 8/1998 | Snoke et al. |
| 5,810,525 A | 9/1998 | Ector, Sr. |
| D409,467 S | 5/1999 | Chung |
| D411,947 S | 7/1999 | Sugimoto et al. |
| 5,954,458 A | 9/1999 | Lee |
| 6,301,997 B1 | 10/2001 | Welte |
| 6,364,580 B1 | 4/2002 | Dils et al. |
| 6,575,590 B1 * | 6/2003 | Wadsworth ................ 362/119 |
| D485,382 S * | 1/2004 | Palm .......................... D26/38 |
| 6,851,487 B1 * | 2/2005 | Shotey ........................ 173/1 |
| 6,926,473 B2 * | 8/2005 | Luebke ....................... 408/16 |
| 6,979,155 B2 * | 12/2005 | Dils et al. ................... 408/16 |
| 7,150,587 B2 * | 12/2006 | Dils et al. ................... 408/16 |
| 2001/0053313 A1 | 12/2001 | Luebke |
| 2002/0054798 A1 * | 5/2002 | Dils et al. .................. 408/124 |
| 2005/0111214 A1 * | 5/2005 | Zeiler ......................... 362/119 |

FOREIGN PATENT DOCUMENTS

| | | |
|---|---|---|
| DE | 3 324 615 | 5/1984 |
| DE | 299 04 877 U1 | 7/1999 |
| EP | 1 036 635 | 9/2000 |
| FR | 2 491 795 | 4/1982 |
| GB | 2107866 | 5/1983 |
| GB | 2 163 914 A | 5/1985 |
| GB | 2366753 | 3/2002 |
| JP | 57075709 A * | 5/1982 |
| JP | 10034565 A * | 2/1998 |
| WO | WO 98/52723 | 11/1998 |

OTHER PUBLICATIONS

International Search Report, mailed Nov. 29, 2001.
International Search Report, mailed Mar. 14, 2003.
Skill Power Tools Web Page Illustrating Dual Source™ Drill.

* cited by examiner

HAND-HELD TOOL WITH A REMOVABLE OBJECT SENSOR

This application claims priority to and is a continuation-in-part of U.S. application Ser. No. 09/993,177 filed Nov. 16, 2001 titled Hand-Held Tool Containing a Removable Attachable Object Sensor, now abandoned which is a continuation-in-part of Ser. No. 09/501,194 filed on Feb. 10, 2000 now U.S. Pat. No. 6,364,580, the entire contents of each are incorporated herein by reference.

The present invention relates to hand-held electric or pneumatic tools having an object sensor removably attached to the tool.

BACKGROUND OF THE INVENTION

Hand-held tools powered by electricity (corded (AC) or battery pack (DC)) or compressed air, such as drills, reciprocating saws, screwdrivers, and nailers are extensively used by electricians, plumbers, carpenters, and others. Common tasks for such devices generally include drilling holes, driving fasteners such as screws, and cutting various materials. Some of these tasks require the use of drill bits and tool bits that are typically stored separately from the hand-held drill.

Frequently, building tradesmen are confronted with the task of finding some suitable structure, such as a stud, hidden behind a visible wall surface to securely hold a nail or screw. Various stud sensors have been developed to locate studs. These sensors can also be used to locate conduit, exhaust vents, rebar, plumbing and other hidden material a tradesman may wish to avoid drilling or cutting into. More importantly, building tradesmen have to drill holes or cut materials in the vicinity of "live" electrical lines. Various sensors have been developed to locate electrical wires, especially "live" wires. Further, other types of sensors have been developed to help tradesmen locate and distinguish different materials hidden behind walls. Collectively, these sensors are defined as object sensors.

While highly effective, one problem with such object sensors is that they are a separate piece of equipment that the tradesman may lose or merely not carry on him when he needs it. Prior art solutions have been to provide the workers with pouches and the like that can be worn about the waist. While these pouches eliminate the need for the operator to leave the workplace to get the object sensor, the workman must remember to first place the object sensor in the pocket and then search the myriad of pockets to find the object sensor. Thus, a significant savings of time may not be realized.

One proposed solution is shown in U.S. Pat. No. 5,262,240, which shows a nail gun having an object sensor attached to the gun. One drawback of this device is that the object sensor is not readily removable from the nail gun and is therefore not easily used separate from the nail gun. Moreover, the sensor is attached to the tool by clamps that require yet another tool to loosen or remove the clamp and thus, the sensor.

Another proposed solution is shown in U.S. patent application publication Ser. No. 2001/0053313 A1, which shows a subsurface object locator that can be attached to the top of a drill housing and is shaped to provide a handrest for operating the drill. The disclosed device, however, requires a special drill housing and also requires several cooperating parts, which increases the cost and complexity of the device.

Therefore, there still exists a need for a hand-held power (AC and/or DC) or pneumatic tool with a removably attached object sensor that is simple to manufacture and that can be used separate from the tool.

SUMMARY OF THE INVENTION

Accordingly, the present invention provides a hand-held power (AC and/or DC) or pneumatic tool having a removable object sensor. The object sensor may be to an attachment member formed as part of the tool housing, or attached to a removable attachment member, such as an accessory tray or battery pack.

In accordance with one embodiment of the present invention, a hand-held power tool is provided with a housing. The housing includes a drive mechanism connected to a rotary output shaft that is aligned along a tool axis. Further, a handle portion is aligned along a handle axis. The handle portion has a power activator switch for activating the drive mechanism. In one embodiment, an object sensor is removably attached to an attachment member formed as part of the housing. In another embodiment, the object sensor is removably attached to an attachment member that, in turn, is removably attached to the housing. The tool may be powered by electricity (AC and/or DC power) or compressed air.

In another embodiment, the tool is a hand-held drill that includes an attachment member where the attachment member is a battery pack. The object sensor may be formed as part of or integral with the battery pack or may be removably attached to the battery pack. The removable attachment member may further comprise a level.

In another embodiment, the hand-held tool is a reciprocating saw having a drive mechanism and a housing. A removable attachment member comprising an object sensor is removably attached to the housing. The reciprocating saw may be powered by electricity (AC or DC) or compressed air.

The above object and other objects, features, and advantages of the present invention are readily apparent from the following detailed description when taken in connection with the accompanying drawings.

DESCRIPTION OF THE INVENTION

Figure 1:
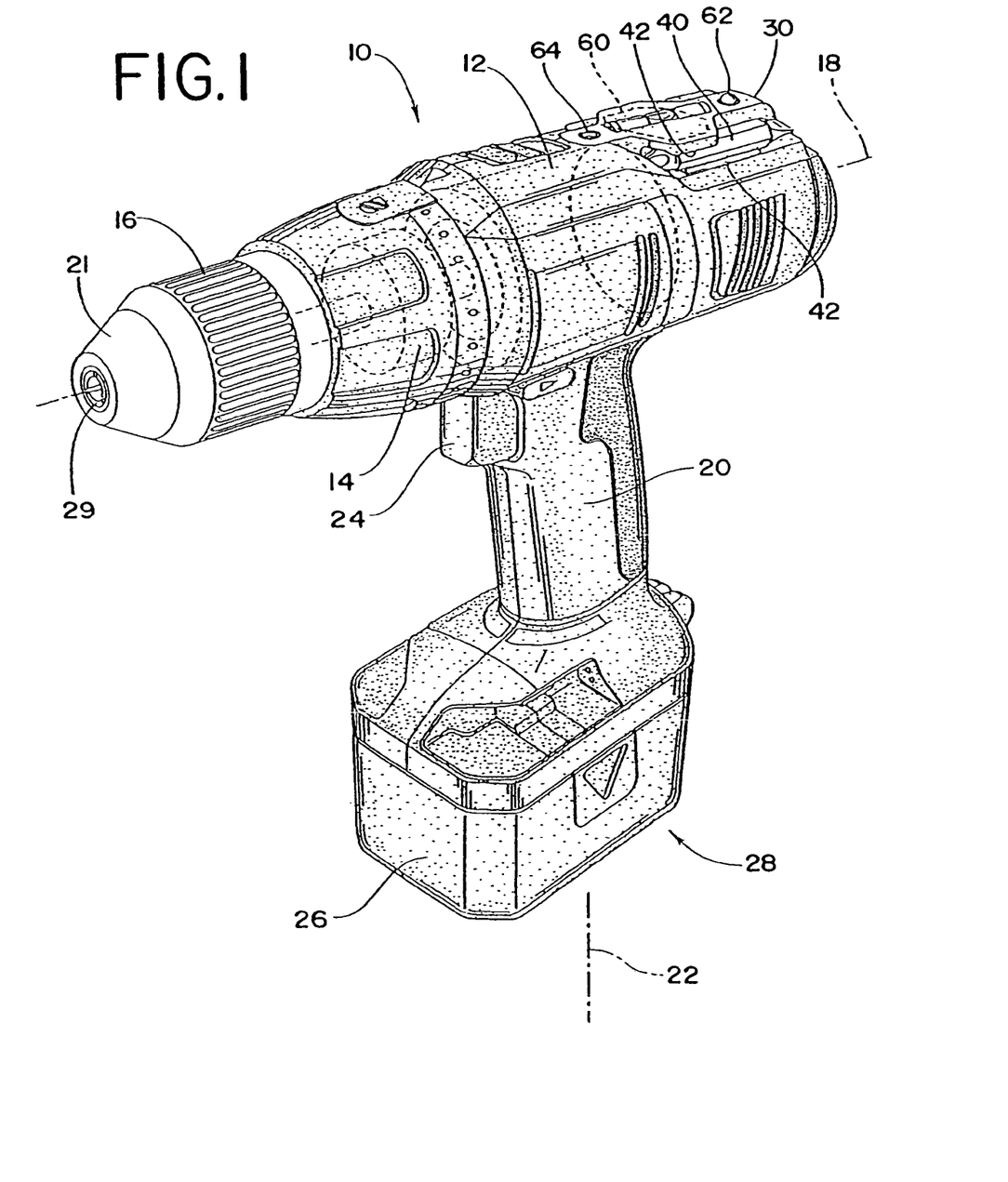
FIG. 1 is a perspective view of a hand-held power tool with a removable attachment member comprising an integral object sensor, in accordance with the present invention.

Referring now to FIG. 1, an electric hand-held power drill 10 is shown. Power drill 10 has a housing 12 that accommodates a drive mechanism and a motor 14 for driving a rotary output shaft 16. The drive mechanism, motor, and rotary output shaft are aligned along a tool axis 18. The housing further includes a handle portion 20 for gripping the power tool, and directing a tool end 21 toward a workpiece. The handle portion is aligned along a handle axis 22.

In operation, a tool such as a tool bit, drill bit, or similar device is coupled to the rotary output shaft for working on a workpiece. The tool is removably coupled to the rotary output shaft using a chuck 29, as conventionally known. The chuck may be keyless or require a key (not shown) to open and close the chuck. Common tasks performed by the tool and hand-held power drill combination include, for example, drilling holes and driving fasteners on and into the workpiece.

Figure 9:
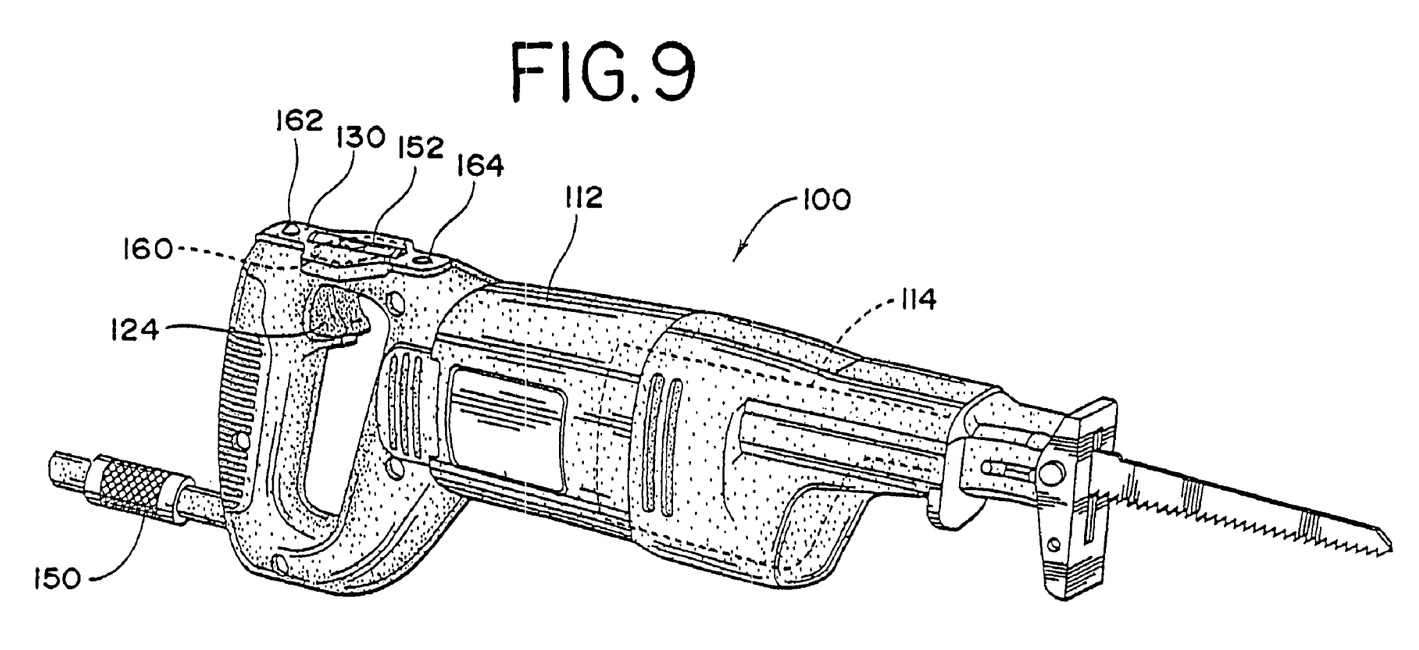
FIG. 9 is a perspective view of a reciprocating saw powered by compressed air with a removable attachment member comprising an integral object sensor and object sensor in accordance with the present invention.

A power activation switch 24 is disposed on the handle for activating the drive mechanism and motor to rotate the rotary output shaft. Preferably, a battery 26 is connected to the handle portion at the power supply end 28 and provides electrical DC power to activate the drive mechanism and motor for rotating the rotary output shaft. The present invention, however, may be incorporated into corded power drills (not shown) supplying AC power as well. The term electric as used in this application means electric power by means of AC or DC power. Additionally, the present invention may be incorporated into compressed air-powered tools as well (as shown in FIG. 9). The drive mechanism and power activation switch for a compressed air-powered tool will be of a type known by those skilled in the art.

Figure 2:
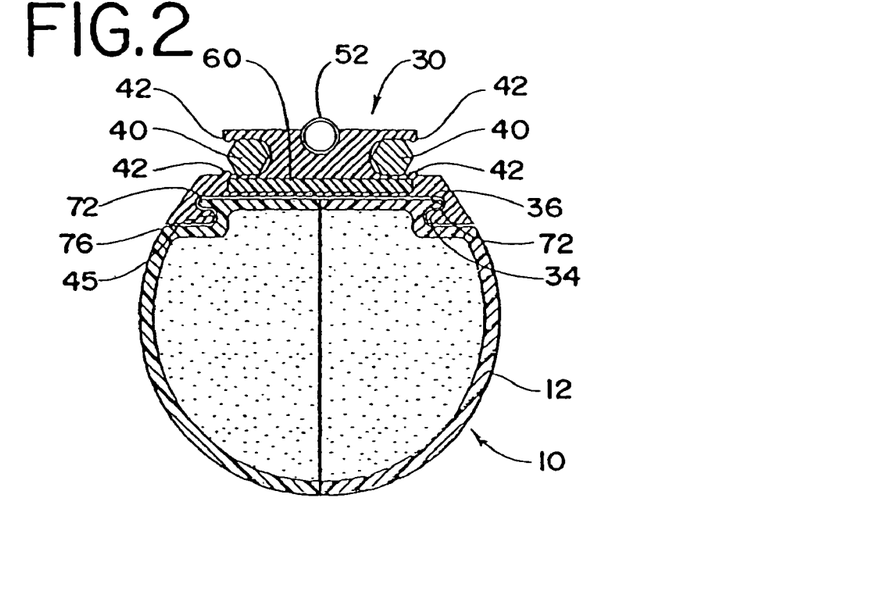
FIG. 2 is a cross-sectional view of a hand-held power tool with a removable attachment member comprising an integral object sensor therein, in accordance with the present invention.

In accordance with one embodiment of the present invention as shown in FIGS. 1 and 2, a removable attachment member 30 is attached to the drill. A further description of the removable attachment member is provided below. The removable attachment member is slid onto housing 12 from the rear. The housing may contain outwardly projecting flanges 72 that create grooves 76. The removable attachment member has inwardly projecting flanges 34 creating grooves 36. When the removable attachment member 30 is slid onto the housing, the flanges 34 and 72 cooperate with grooves 36 and 76 to fix the removable attachment member onto the housing 12 as shown in FIG. 2.

Figure 3:
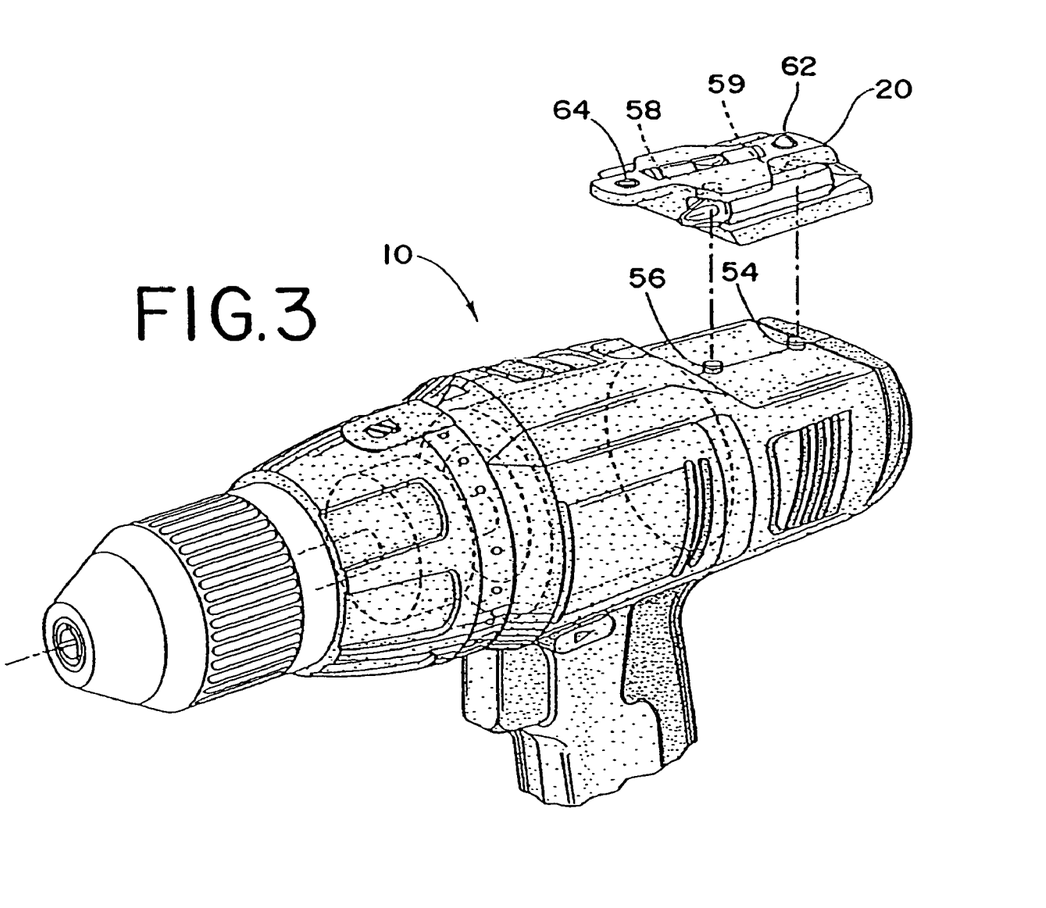
FIG. 3 is a perspective view of a hand-held power tool with a removable attachment member comprising an integral object sensor and a level, in accordance with the present invention.

Alternatively, as shown in FIG. 3, the removable attachment member can be attached to the drill using a pair of protrusions 54 and 56 extending upward from the housing. A pair of recesses 58 and 59 formed in the bottom of the removable attachment member are sized to receive protrusions 54 and 56 to removably attach the removable attachment member to the housing. Conversely, the removable attachment member may comprise protrusions and the housing may contain recesses to receive the protrusions. Other attachment schemes, known to individuals of ordinary skill in the art that allow the removable attachment member to be removably attached to the housing may also be used.

Figure 4:
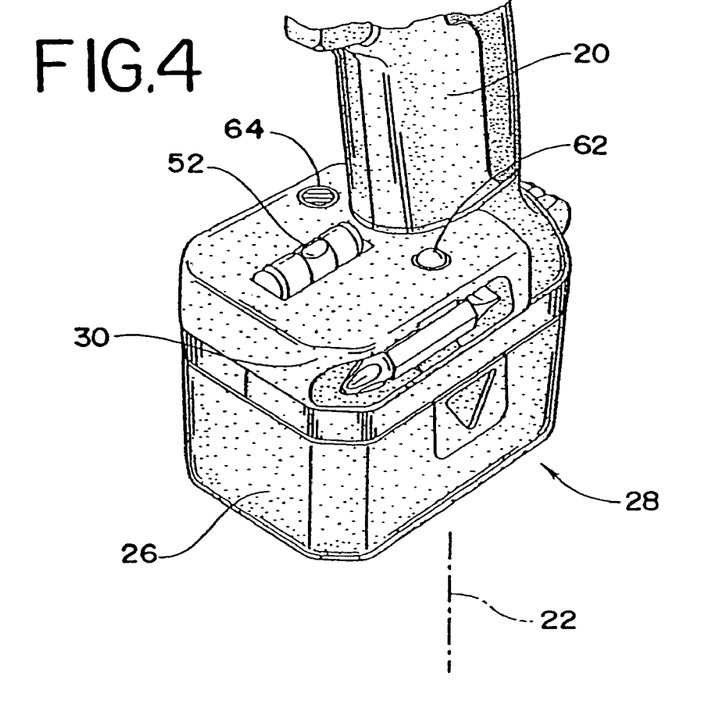
FIG. 4 is a perspective view of the power source end of a hand-held power tool with a removable attachment member comprising an integral object sensor and a level in accordance with the present invention.
Figure 5:
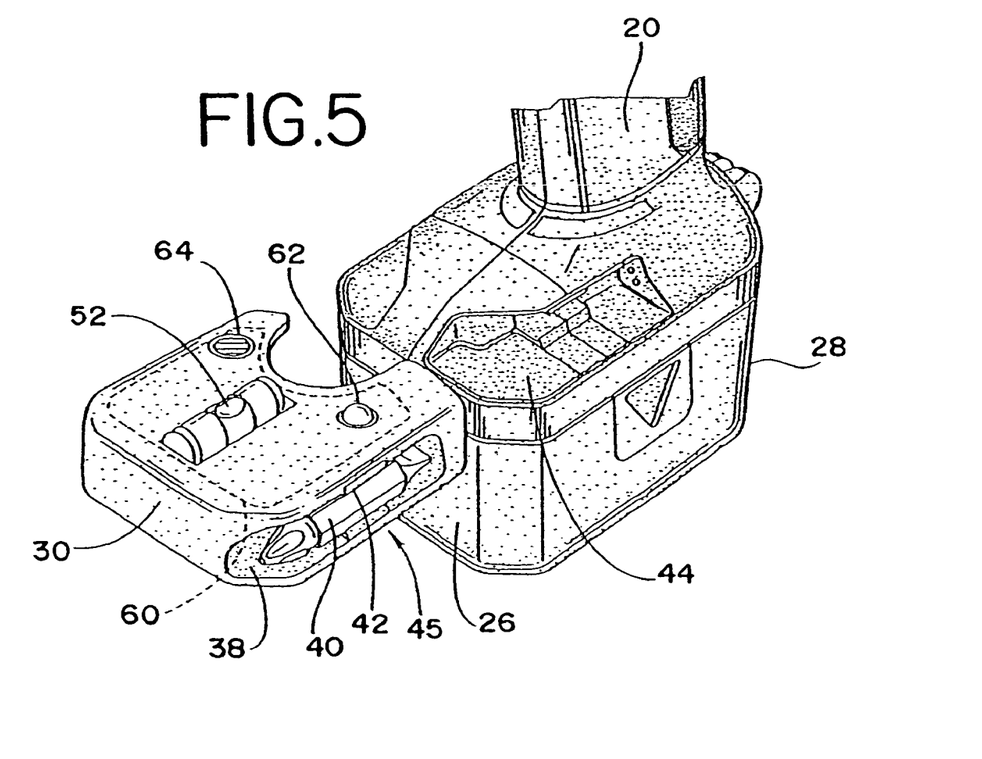
FIG. 5 is a perspective view of the power source end of a hand-held power tool with a removable attachment member comprising an integral object sensor and a level, in accordance with the present invention.

In an alternative embodiment illustrated in FIGS. 4 and 5, the removable attachment member is disposed at the power supply end 28 of the handle portion. The power supply end has a pair of slots 44 configured to removably affix the attachment member 30 to the housing. The removable attachment member has an underside 45 formed to fit slots 44 for removable attachment thereto.

Figure 7:
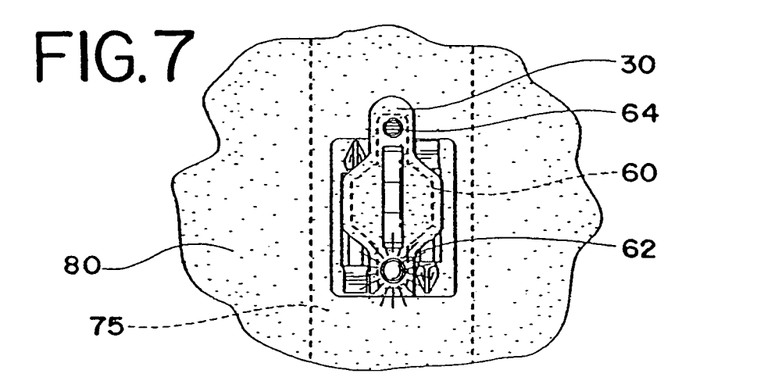
FIG. 7 is a top of the removable attachment member comprising an integral object sensor in accordance with the present invention.

As best shown in FIGS. 2 and 5, the removable attachment member includes an object sensor 60 for detecting objects such as studs, electrical lines, conduit, pipe, various metals, rebar, and other materials hidden from view by, for example, drywall. The object sensor 60 is of a type commonly available. The object sensor 60 may include at least one visible light 62 that illuminates when the object sensor is placed over, for example, a stud, as shown in FIG. 7. Further, the object sensor may comprise a speaker 64 that makes an audible sound when, for example, a stud or "live" wire is detected. Other features, such as meters, may also be included depending on the features of the object sensors.

The removable attachment member may be configured with a level 52. The removable attachment member may also be provided with a recess 38 for receiving a tool bit 40 where the bit is captured in the recess by a detent formed by two opposing spring protrusions 42. Preferably, an identical recess 38 is disposed on the opposite side of the removable attachment member having a detent formed by spring protrusions 42 for holding another tool bit 40 securely in place.

Figure 6:
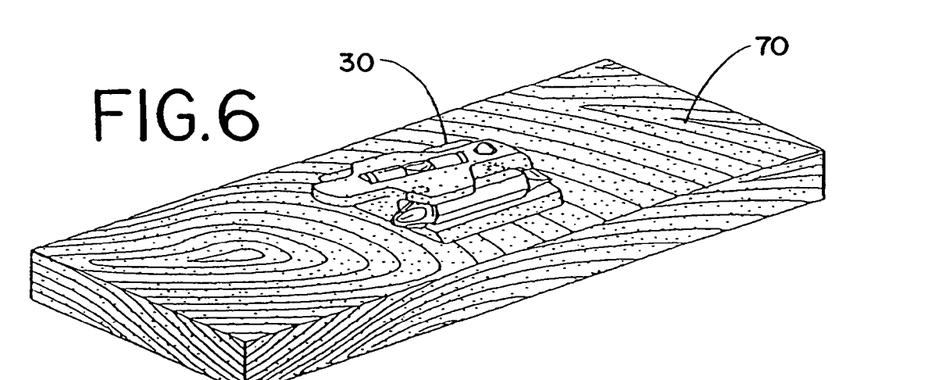
FIG. 6 is a perspective view of the removable attachment member comprising an integral object sensor and a level on a piece of wood in accordance with the present invention.

In operation, the drill of the present invention is used as a normal drill. When the tradesman must check the orientation of a surface, he can detach the removable attachment member from the drill and place it on a surface 70 as shown in FIG. 6. To locate a stud or other hidden materials, the removable attachment member is detached from drill 10 and moved along a surface 80 until stud 75 is located as shown in FIG. 7.

Figure 8:
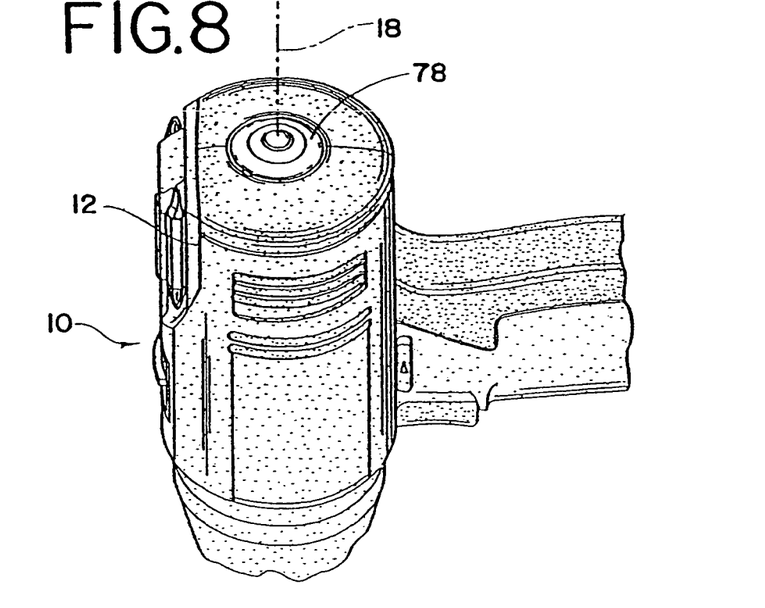
FIG. 8 is a perspective view of a hand-held power tool having a bull's eye level.

Additionally, as shown in FIG. 8, a bull's eye bubble level 78 is disposed at the rear end of housing in a plane essentially perpendicular to tool axis to indicate when the tool axis is vertical.

The present invention may also be incorporated onto other hand-held power tools such as a reciprocating saw (as shown in FIG. 9), a nailer, a power screwdriver, a circular saw, or a jigsaw. The tools may be powered by electric power (corded (AC) or battery operated (DC)), compressed air, or other means.

Referring to FIG. 9, a reciprocating saw 100 has a housing 112, and a drive mechanism 114. In this example, the drive mechanism is powered by compressed air through nipple 150 in a manner known by those skilled in the art. The removable attachment member 130 comprises an object sensor 160 and is removably attached to the housing 112 in any manner as described above. The object sensor 160 may further comprise a light 162 and speaker 164 to alert the tradesman of the presence of a stud, electrical line, or other hidden materials.

Figure 10A:
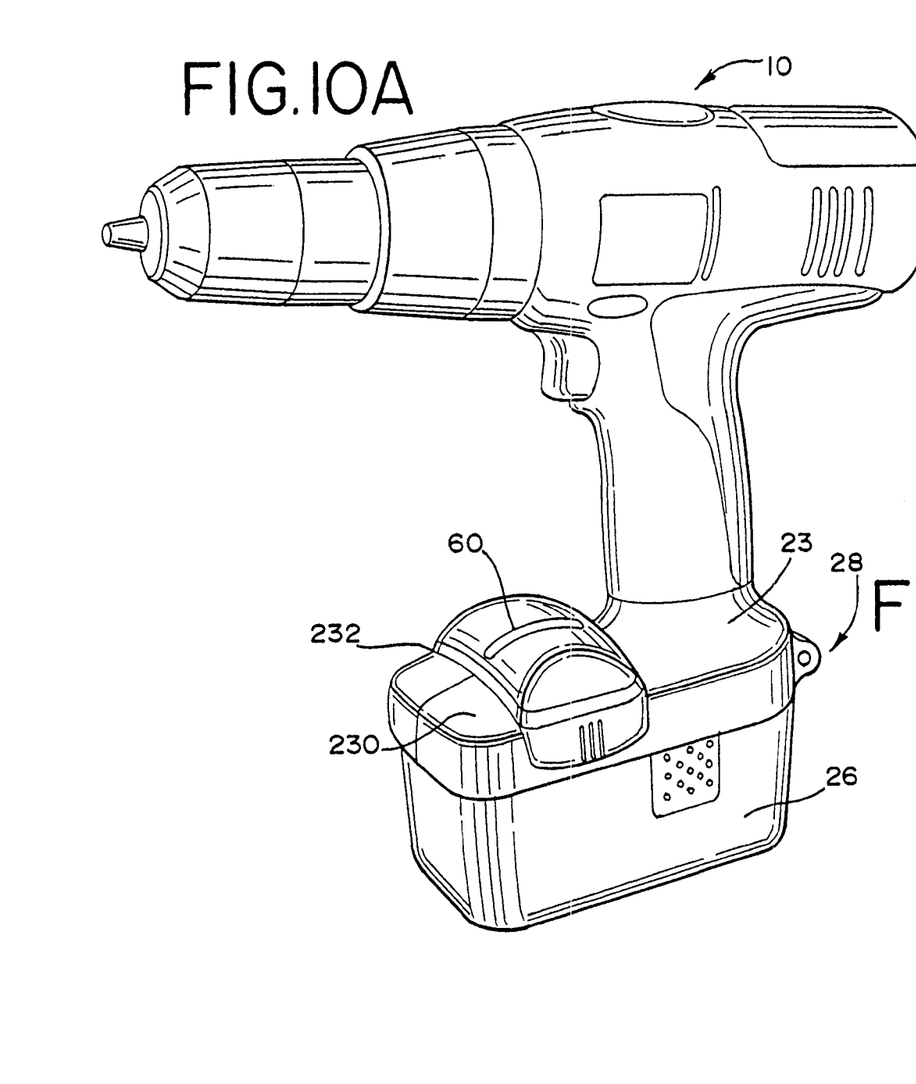
FIG. 10A is a perspective view of a hand-held power tool with a removably attached object sensor attached to an attachment member formed on a foot portion of the drill housing.
Figure 10B:
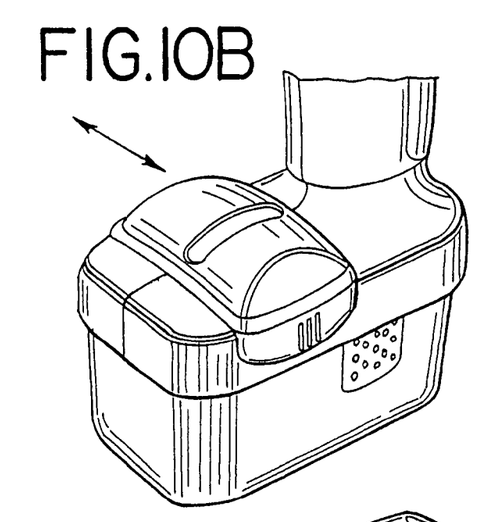
FIG. 10B is an enlarged view of a portion of the hand-held power tool showing the direction in which the object sensor is moved to remove the object sensor from the attachment member formed on a foot portion of the drill housing.
Figure 10C:
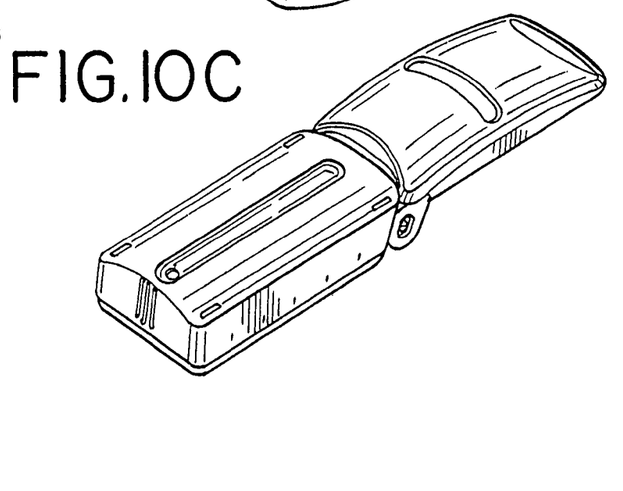
FIG. 10C is one embodiment of an object sensor shown in an open operable position for use with the hand-held power tool of FIG. 10A.

Referring now to FIGS. 10A–C, a power tool 10 such as a hand drill is provided with an attachment member 230 formed at the power supply end 28 of the drill. The attachment member in this embodiment is not removable but rather is formed as part of the drill housing and, in particular the power supply end of the drill. In a preferred embodiment, the attachment member is formed as part of a foot portion 23 of the tool housing. The attachment member 230 is provided with a groove 232 to slidably receive an object sensor 60. Preferably, the groove is shaped so that it slidably receives the sensor, which has a portion shaped complementary to the groove, in a single direction. Accordingly, as best seen in FIG. 10B, the arrow indicates the direction of sliding travel to remove and replace the object sensor from the attachment member.

As a result, the object sensor in a storage position is attached to the attachment member. When the tradesman wishes to use the sensor, it is slidably removed from the attachment member and, depending on the type of sensor; it may be opened or put in an operable position, as shown in FIG. 10C. In the open or operable position, the sensor is ready and able to detect desired objects.

Figures 11A, 11B, 11C, 11D:
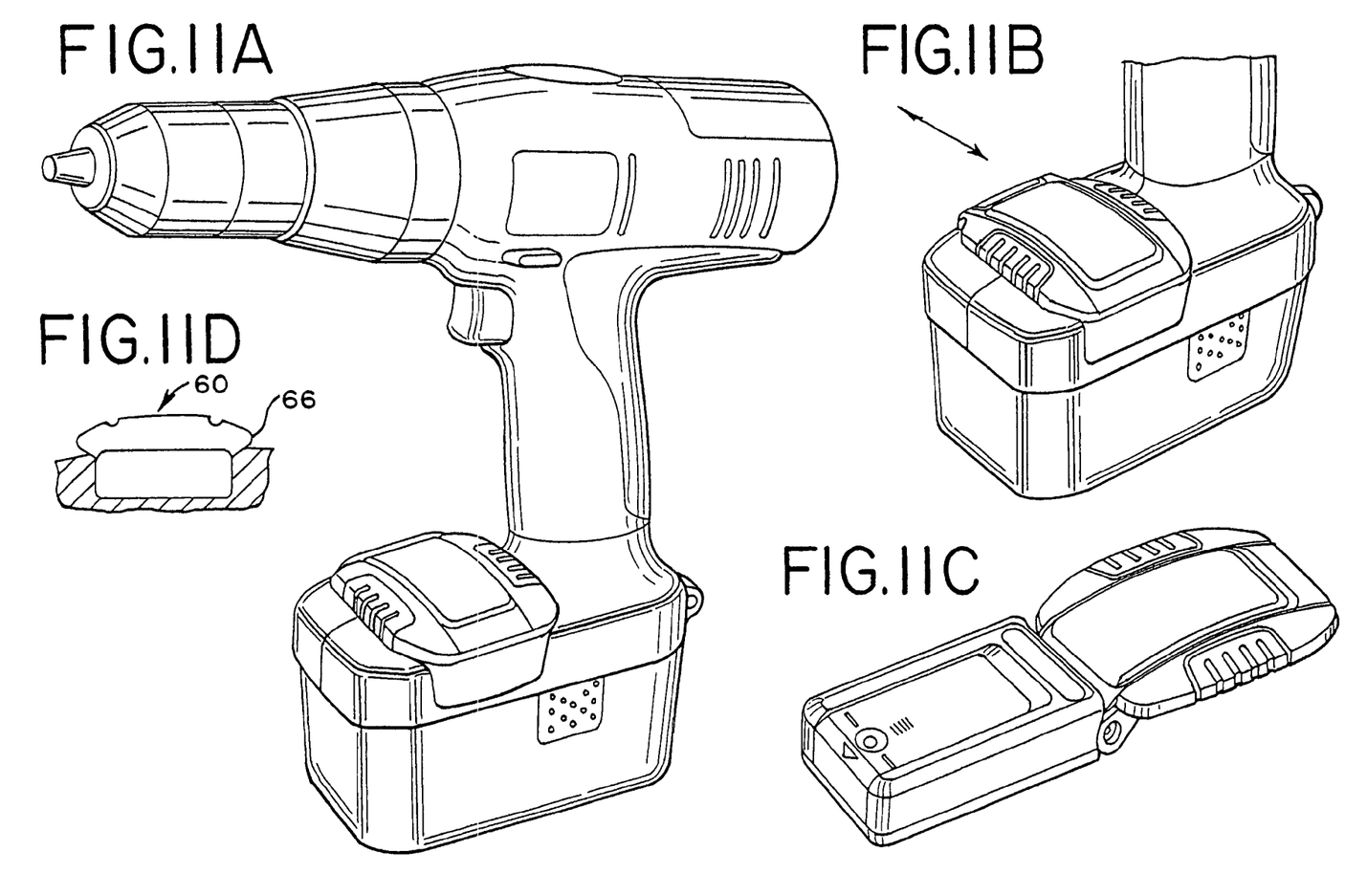
FIG. 11A is a perspective view of a hand-held power tool with a removably attached object sensor attached to an attachment member formed on a foot portion of the drill housing.
FIG. 11B is an enlarged view of a portion of the hand-held power tool showing the direction in which the object sensor is moved to remove the object sensor from the attachment member formed on a foot portion of the drill housing.
FIG. 11C is one embodiment of an object sensor shown in an open operable position for use with the hand-held power tool of FIG. 11A.
FIG. 11D is enlarged view of a portion of the hand-held power tool showing the object sensor attached to a portion of the hand-held power tool.

FIGS. 11A–C show an embodiment of a power tool similar to that shown in FIGS. 10A–C. In this embodiment, however, the object sensor 60 is shaped such that it has lips 66 that overhang the groove, as best seen in FIG. 11D.

Figure 12A:
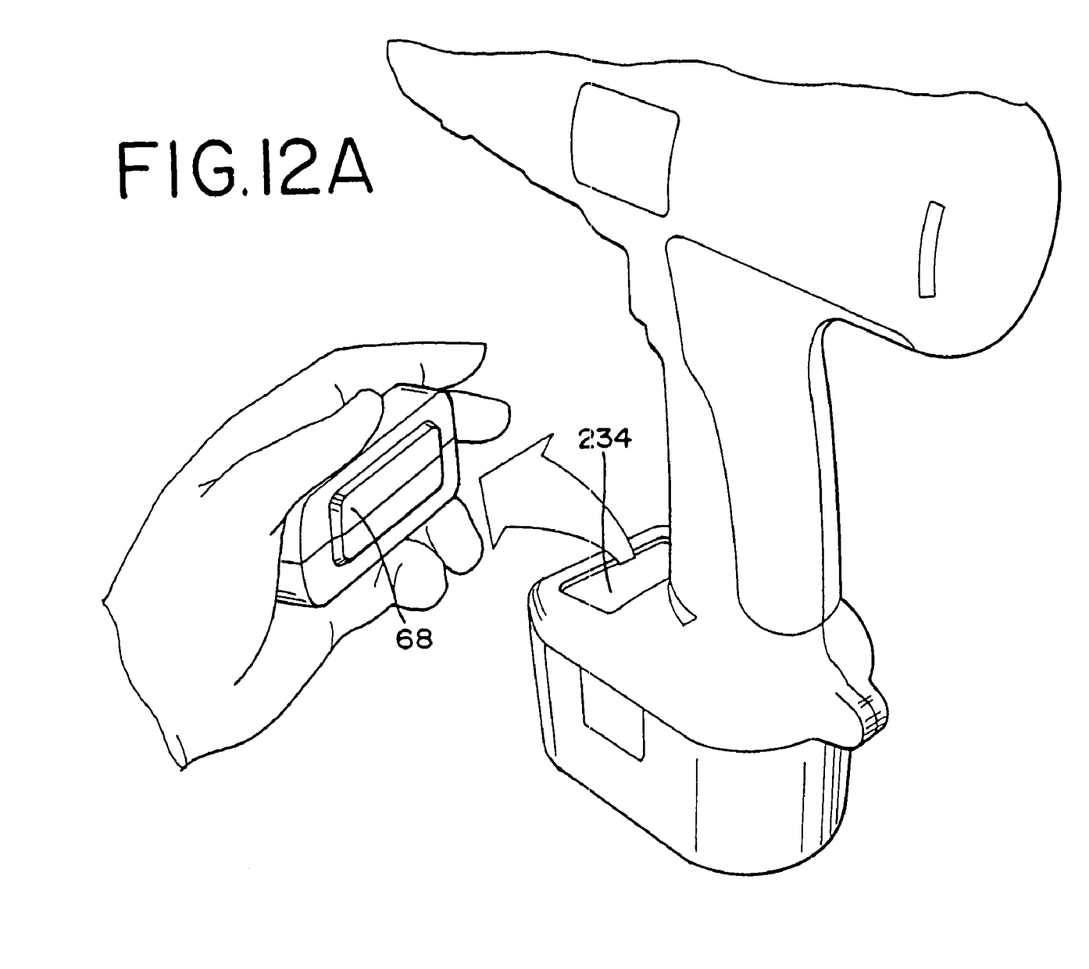
FIG. 12A is a perspective view of a hand-held power tool with a removably attached object sensor attached to an attachment member formed on a foot portion of the drill housing.
Figure 12B:
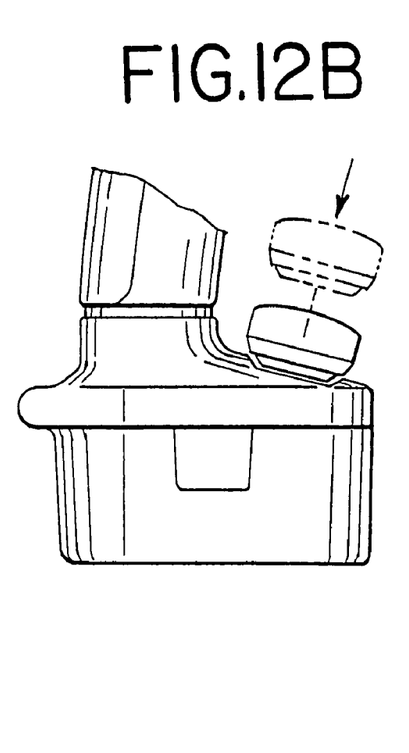
FIG. 12B is an enlarged view of a portion of the hand-held power tool showing the direction in which the object sensor is moved to remove the object sensor from the attachment member formed on a foot portion of drill housing.

FIGS. 12A and 12B show another embodiment of a power tool 10 such as a hand drill provided with an attachment member 230 formed at the power supply end 28 of the drill. The attachment member in this embodiment is not removable but rather is formed as part of the drill housing and, in particular the power supply end of the drill. The attachment member 230 is provided with a surface for removably attaching the object sensor. Preferably in this embodiment, the attachment member is provided with a magnetic surface 234 that will magnetically receive a surface 68 on the sensor to removably attach the sensor to the attachment member. FIG. 12A depicts a tradesman removing the object sensor from the attachment member and FIG. 12B depicts the direction in which the object sensor is moved to attach it to the attachment member.

Figure 13:
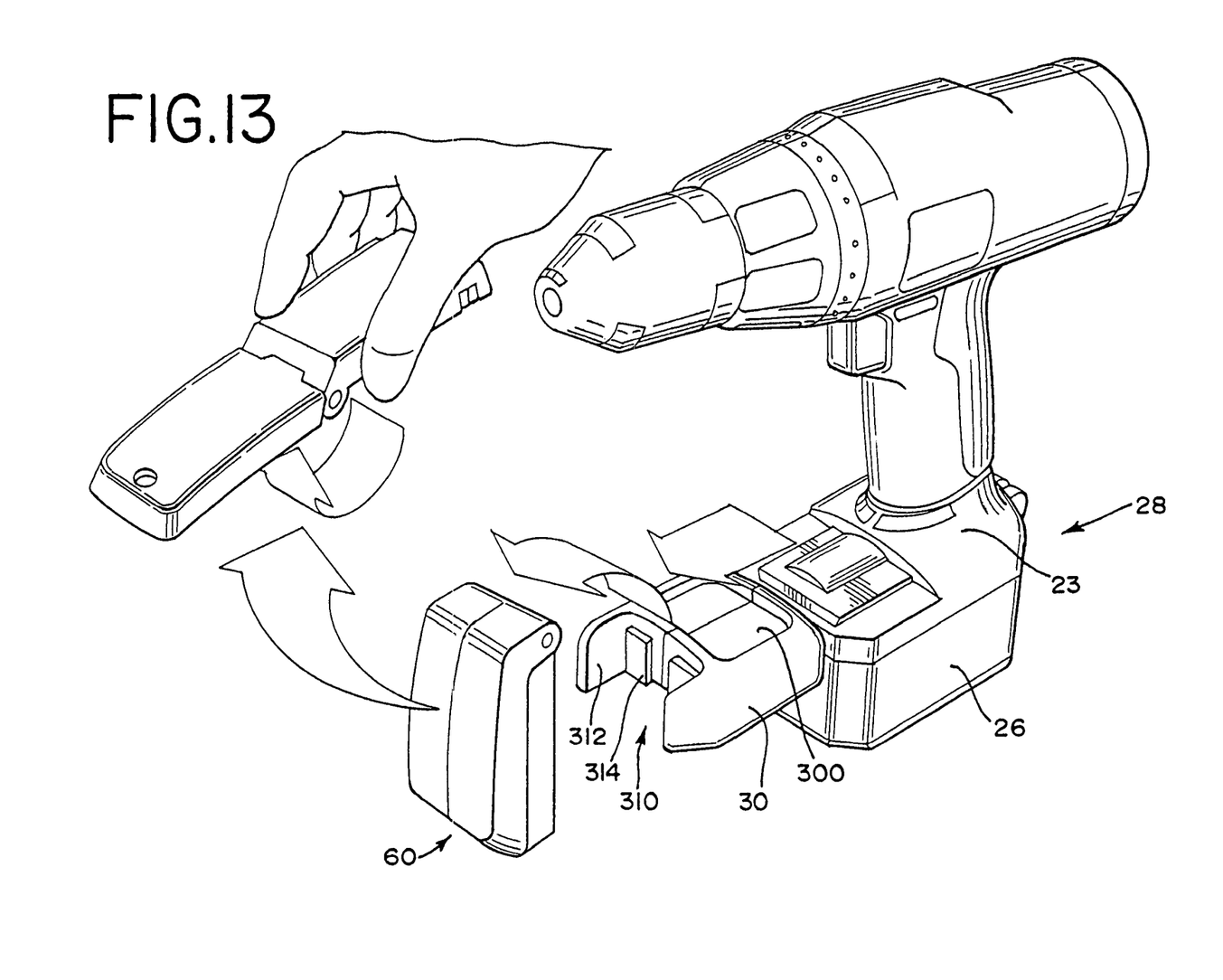
FIG. 13 is a perspective view of a hand-held power tool with a removably attached object sensor attached to a removable attachment member that engages a foot portion of the drill housing. The figure shows the removal of the attachment member, the subsequent removal of the object sensor, and the opening of the object sensor to an operable position.

FIG. 13 depicts yet another embodiment of the subject invention. In this embodiment, the attachment member 30 is removable from a portion of the drill housing at the power supply end. More particularly, the attachment member is removable from a foot portion 23 of the drill housing. The attachment member can be removably attached to the foot portion in any suitable manner such as by a sliding arrangement.

The object sensor 60 is removably attached to the attachment member 30. In the embodiment shown in FIG. 13, the attachment member is provided with a coupling member 310 to removably receive the object sensor. The coupling member may be provided with a pair of arms 312 engage the object sensor. Preferably, the arms engage the object sensor such that the object sensor can be removed and attached from a single direction, e.g., such as from the top in a vertical motion. The arms may be resilient to provide a snug fit when the object sensor is engaged.

Alternatively, the coupling member may be provided with a portion of a complementary engagement member 314 such as a tongue portion for a tongue and groove engagement member to receive a complementary portion provided on the object sensor (not shown). In this arrangement, the object sensor will be engaged with the attachment member from a single direction. For example, the object sensor will be lifted upward to slidably disengage the object sensor from the coupling member provided on the attachment member.

A desirable feature that may be provided with the attachment member of this embodiment is a tray 300 that can be used for storing objects useful with the tool. For example, drill bits, screws, and the like can be stored in the tray. The tray may be magnetized to better retain objects placed in the tray. Alternatively, a cover (not shown) could be placed over the tray to retain objects placed within the tray.

Figure 14:
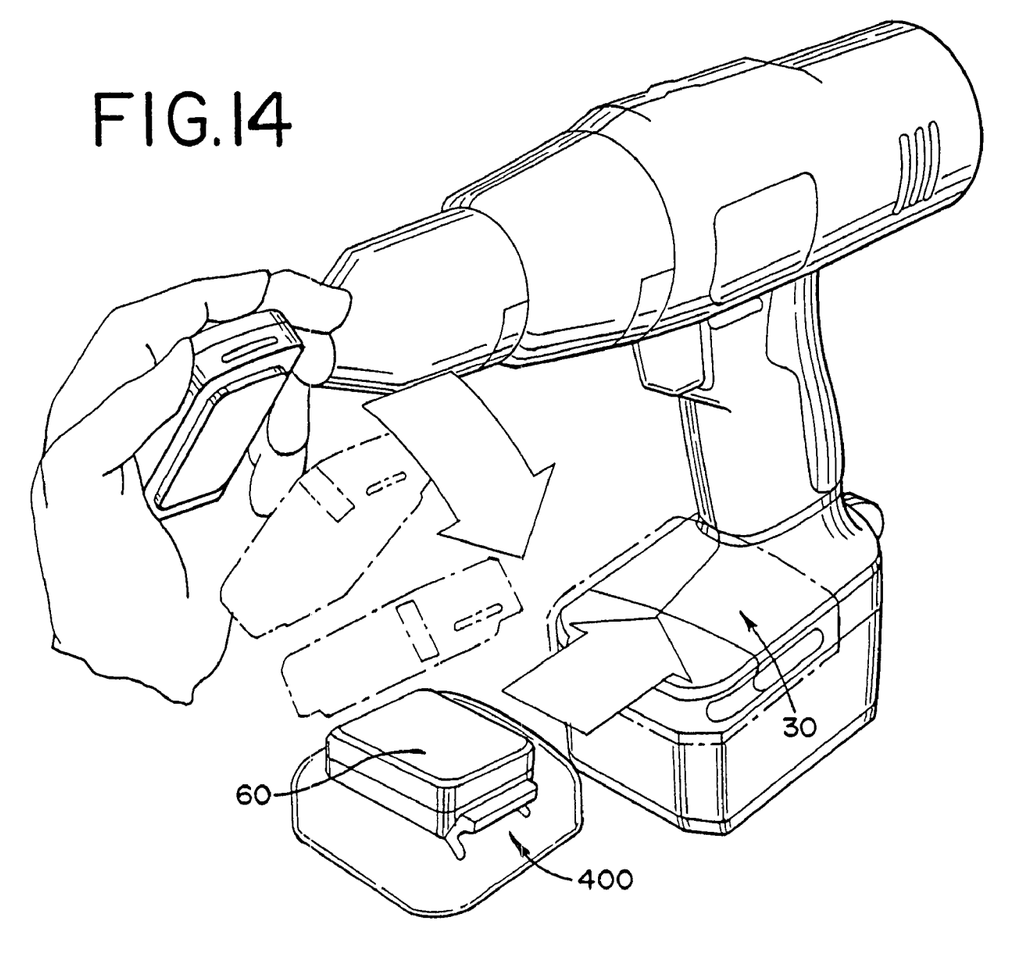
FIG. 14 is a perspective view of a hand-held power tool with a removably attached object sensor attached to a removable attachment member that engages a foot portion of the drill housing. The figure shows the connection of the object sensor to the attachment member and the subsequent attachment of the attachment member onto a portion of the drill housing.

FIG. 14 shows another embodiment of the hand-held tool with a removable object sensor of the present invention. In particular, FIG. 14 depicts the reattachment of the object sensor 60 to a cover 400 or attachment plate and the direction that the cover 400 travels if it were to be subsequently attached to an attachment member 30 such as that shown in FIG. 5. Similar to the embodiment shown in FIG.

13, the object sensor is removably attached to an attachment member that itself is removably attached to the drill housing, and in particular to a foot portion 23 of the drill housing.

Figures 15A, 15B:
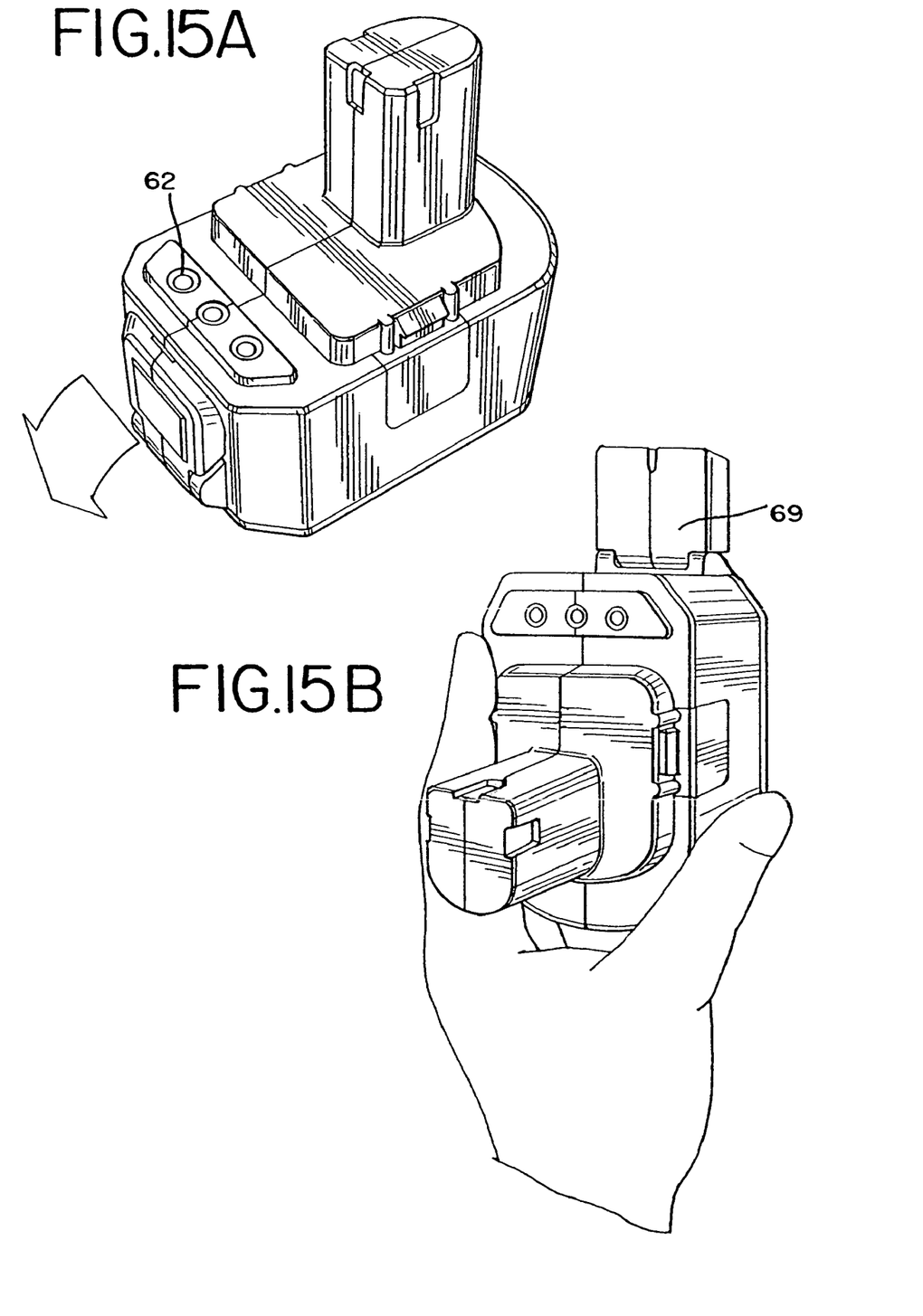
FIG. 15A is a perspective view of an object sensor integrally formed as part of a removable attachment member, where the removable attachment member is a removable battery pack that attaches to the handle portion of the drill housing.
FIG. 15B is a perspective view of the object sensor of FIG. 15A with the sensor in an operable position.
Figure 16A:
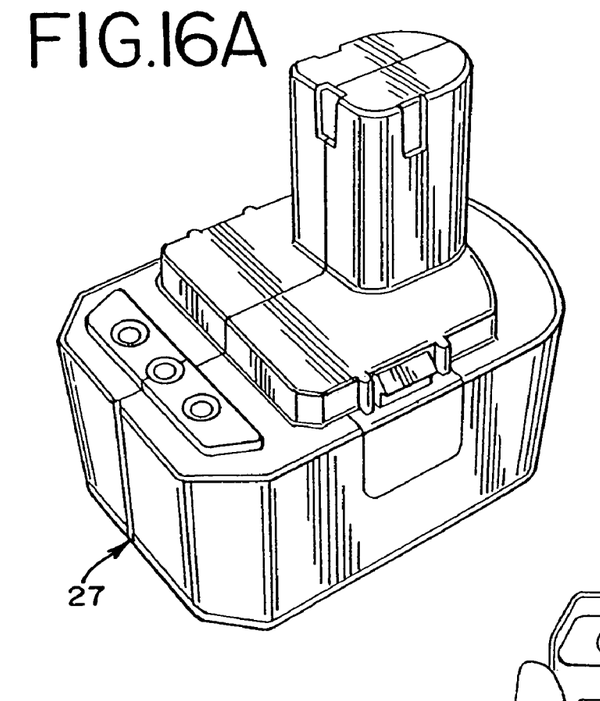
FIG. 16A is a perspective view of an object sensor integrally formed as part of a removable attachment member, where the removable attachment member is a removable battery pack that attaches to the handle portion of the drill housing.
Figure 16B:
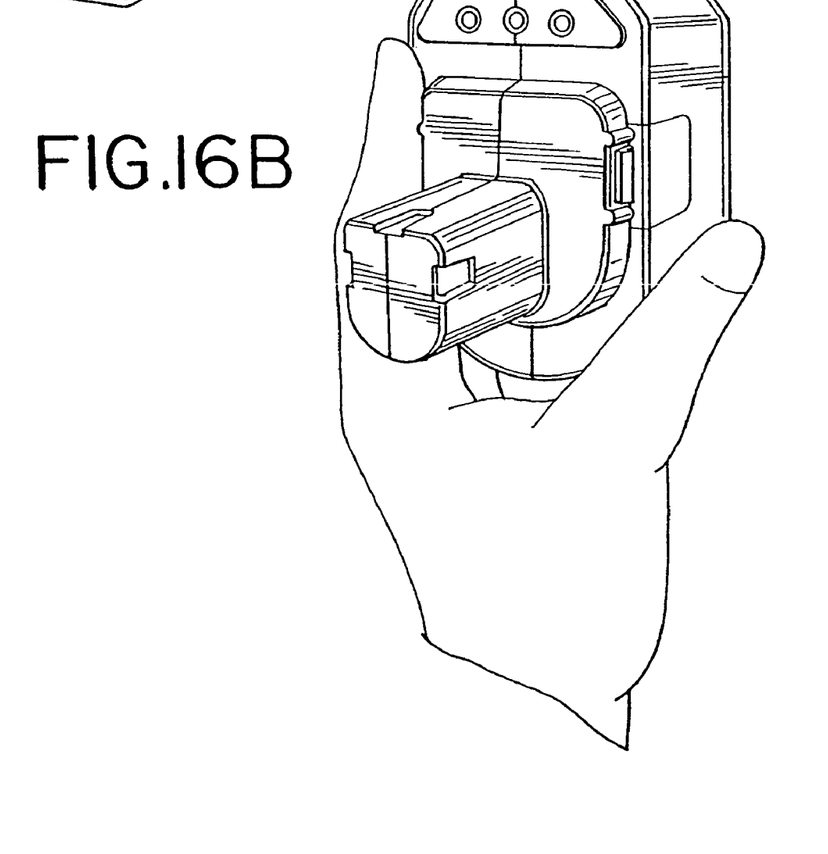
FIG. 16B is a perspective view of the object sensor of FIG. 16A with the sensor in an operable position.
Figures 17A, 17B:
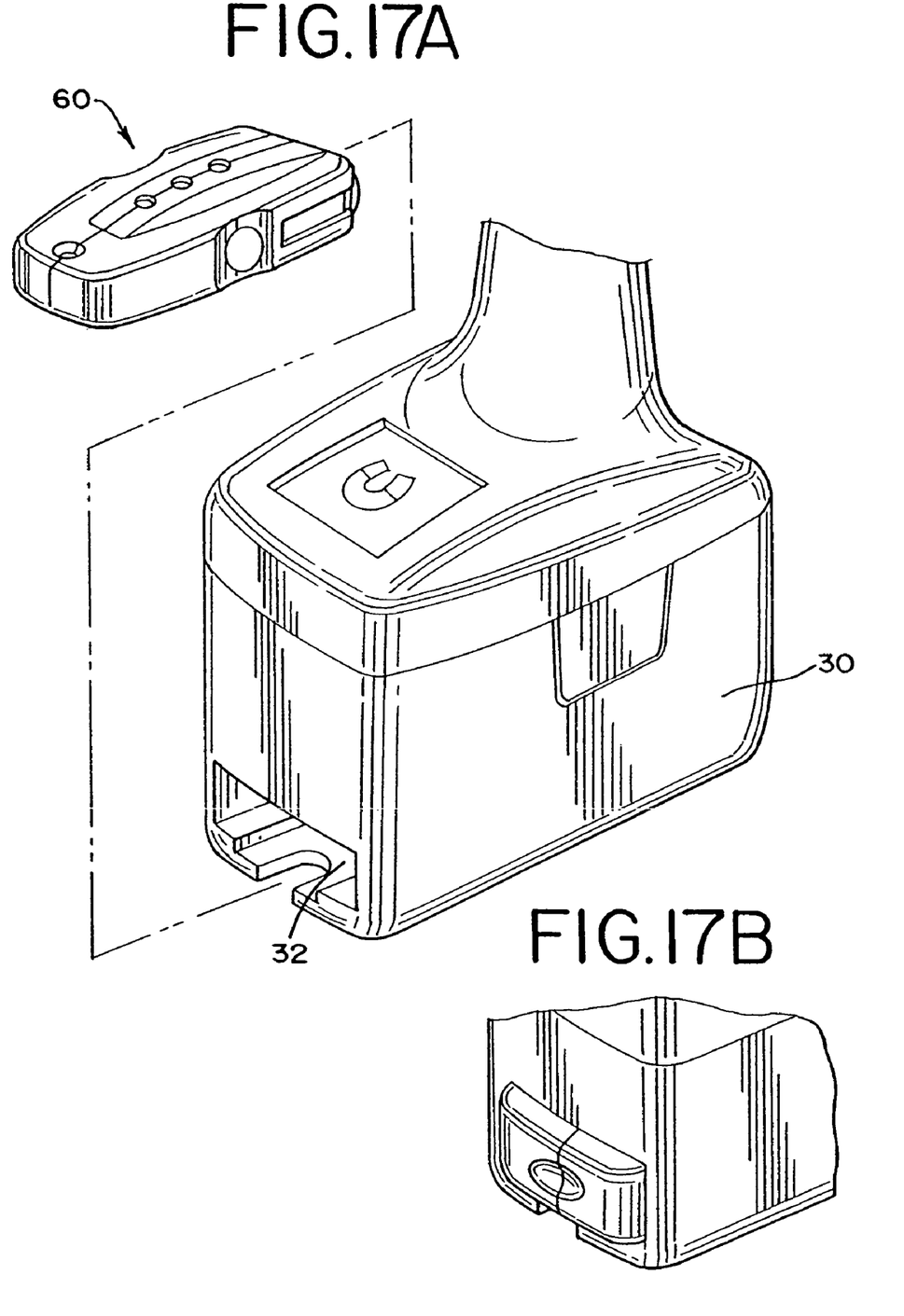
FIG. 17A is an exploded view of a removable object sensor attached to a removable attachment member, where the removable attachment member is a removable battery pack that attaches to the handle portion of the drill housing.
FIG. 17B is the removable object sensor of FIG. 17A attached to the attachment member.

FIGS. 15, 16, and 17 each show a different embodiment of the present invention where the attachment member comprises the battery pack, which is removable from the tool housing. Turning now to FIGS. 15A and 15B, the attachment member comprises a battery pack 26 for use with a power tool such as a drill as shown in, for example FIG. 1. The object sensor 60 is formed integral with the attachment member. To use, a sensor board 69 of the sensor is rotated or extended from the attachment member to an open position and when an object is located, a light 62 may be illuminated.

FIGS. 16A and 16B show a similar arrangement as FIGS. 15A–B, where the object sensor is integral with the attachment member and where the attachment member comprises the battery pack. In this embodiment, the sensor board is integral with the attachment member. A groove 27 is provided to mark the location of the object being sensed.

FIGS. 17A and 17B show an embodiment of the present invention where the attachment member 30 comprises a battery pack. In this embodiment, the attachment member has an opening 32 to removably receive the object sensor 60. In particular, the object sensor is inserted into the opening and held in place by any known method such as flanges and the like.

Thus, the present invention has many advantages and benefits over the prior art. For example, the present invention provides a means for making a sensor and level readily available to a tradesman.

Alternatively, the object sensor can be designed to attach to the electric power cord and/or the compressed air hose. The object sensor may comprise a trough on any of its surfaces sized to receive the electric power cord and/or compressed air hose. The trough may be sized slightly smaller than the cord and/or hose for secure attachment. Tangs may project from the surface having the trough to partially cover the trough to further secure the cord and/or hose. When the tradesman desires to use the object sensor, he can either use the sensor attached to the cord and/or hose or simply remove the object sensor from the cord and/or cable by gently pulling on the object sensor until it is released. When finished, the tradesman can reattach the object sensor to the cord and/or hose by pressing the cord and/or hose into the trough.

The object sensor may also be attached to the cord and/or hose using a C-shaped clamp that is attached to the housing. The C-shaped clamp may be manufactured out of a resilient plastic or metal such that it flexes to fit over the cord and/or hose and then snaps back securely around the cord and/or hose. The other end of the clamp may be directly attached to the object sensor or connected to the object sensor using a chain or similar device. Similarly, the tradesman may use the object sensor while it is attached to the cord and/or hose or he may remove the object sensor with a gentle pull for use and reattach it to the cord and/or hose when finished using it.

One skilled in the art may devise alternate methods of attaching the object sensor to the cord and/or hose. While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable power tool comprising:
    a. a housing comprising a drive mechanism, a motor, a handle portion aligned along a handle axis and having a power activator switch, and a power supply end; and
    b. an object sensor releasably attached to an attachment member located near the power supply end.

2. The portable tool of claim 1 wherein the attachment member is integrally formed as a part of a foot portion of the housing.

3. The portable tool of claim 1 wherein the attachment member is removable from a foot portion of the housing.

4. The portable tool of claim 2 wherein the attachment member contains a groove to slidably receive the object sensor.

5. The portable tool of claim 4 wherein the object sensor is slidably received from only a single direction.

6. The portable tool of claim 2 wherein the attachment member has a magnetic portion to magnetically receive a portion of the object sensor.

7. The portable tool of claim 2 wherein the attachment member further comprises a tray.

8. The portable tool of claim 3 wherein the attachment member further includes a coupling member to removably receive the object sensor.

9. The power tool of claim 8 wherein the coupling member comprises a pair of arms to receive the object sensor.

10. The power tool of claim 2 further comprising an attachment plate that is removably received by the attachment member and the object sensor is removably attached to the attachment plate.

11. The power tool of claim 3 wherein the attachment member further comprises a battery pack.

12. The power tool of claim 11 wherein the object sensor is formed integral with the battery pack.

13. The power tool of claim 12 wherein the object sensor includes a sensor board that is extendible from the battery pack.

14. The power tool of claim 11 wherein the object sensor is removable from the battery pack.

15. The power tool of claim 14 wherein the battery pack contains a slot to slidably receive the object sensor.

* * * * *

UNITED STATES PATENT AND TRADEMARK OFFICE
CERTIFICATE OF CORRECTION

PATENT NO. : 7,217,069 B2
APPLICATION NO. : 10/832493
DATED : May 15, 2007
INVENTOR(S) : Dils et al.

It is certified that error appears in the above-identified patent and that said Letters Patent is hereby corrected as shown below:

On the Title page,

Item [*] Notice and item 45:    Subject to any disclaimer, the term of this patent is extended or adjusted under 35 USC 154(b) by (561) days Delete the phrase "by 561 days" and insert -- by 495 days--

Signed and Sealed this

Eleventh Day of December, 2007

JON W. DUDAS
*Director of the United States Patent and Trademark Office*